United States Patent Office 3,521,763
Patented July 28, 1970

---

3,521,763
AUTOMATIC PAN UNSTACKER
Henry A. Heide, Addison, and Willis Clark Pulver, Oak Lawn, Ill., assignors to Velten & Pulver, Inc., Chicago, Ill., a corporation of Illinois
Filed Jan. 2, 1969, Ser. No. 788,473
Int. Cl. D65g *47/24*
U.S. Cl. 214—8.5                        17 Claims

ABSTRACT OF THE DISCLOSURE

There is disclosed a machine for removing bread pans one-by-one from a stack thereof comprising an infeed conveyor, an inclined conveyor disposed adjacent to the discharge end of the infeed conveyor, a stack support frame at the juncture of the conveyors and movable between a first position for receiving a stack of pans from the infeed conveyor and a second position for placing the stack of pans upon the inclined conveyor, lower and upper discharge conveyors for engaging respectively the lower and upper ends of the top pan on the inclined conveyor to remove the top pan therefrom, and thus to deposit the pans one-by-one sequentially on the lower discharge conveyor, drive mechanisms for the conveyors, and control mechanism responsive to the drive mechanism for the inclined conveyor to halt operation of the machine when a stack of pans on the inclined conveyor is not being readily conveyed thereby. In a modification of the invention, two of the automatic pan unstacking machines are positioned side-by-side for alternately feeding pans one-by-one to a common outfeed conveyor.

---

The present invention relates to machines for unstacking bread pans and the like from stacks thereof, and particularly to improved control mechanism and actuating mechanism for the several pan handling components thereof.

It is an important object of the invention to provide an improved machine for removing bread pans and the like one-by-one from a stack thereof, the machine comprising an infeed conveyor for conveying a stack of pans, and an inclined conveyor disposed adjacent to the discharge end of the infeed conveyor, a stack support frame positioned adjacent to the discharge end of the infeed conveyor, the stack support frame having a first position for receiving and arresting the movement of a stack of pans from the infeed conveyor and a second position for placing the stack of pans upon the inclined conveyor, support drive mechanism for moving the stack support frame between the first and second positions thereof to receive and to arrest a stack of pans and to place the arrested stack of pans upon the inclined conveyor, a discharge conveyor for engaging the top pan on the stack of pans disposed on the inclined conveyor sequentially to remove the top pan from the stack of the pans and to deposit the pans one-by-one on an outfeed conveyor, drive mechanisms for the conveyors, and control mechanism responsive to the drive mechanism for the inclined conveyor to halt operation of the drive mechanism when a stack of pans on the inclined conveyor is not readily conveyed thereby.

In connection with the foregoing object, it is another object of the invention to provide a machine of the type set forth wherein the discharge conveyor includes a lower discharge conveyor for engaging the adjacent lower end of the top pan on the stack of pans and an upper discharge conveyor for engaging the adjacent upper end of the top pan of the stack of pans, the discharge conveyors cooperating to deposit the pans one-by-one on the lower discharge conveyor.

Another object of the invention is to provide a system for unstacking bread pans and the like comprising two automatic bread pan unstackers of the type set forth connected and arranged alternately to feed pans one-by-one to a common outfeed conveyor, thereby to give a continuous supply of unstacked pans.

Further features of the invention pertain to the particular arrangement of the parts of the machine for unstacking bread pans and the like, whereby the above-outlined and additional operating features thereof are attained.

The invention, both as to its organization and method of operation, together with further objects and advantages thereof, will best be understood by reference to the following specification taken in connection with the accompanying drawings, in which:

Referring particularly to FIGS. 1 to 4 of the drawings, there is illustrated an automatic pan unstacking machine generally designated by the numeral 100 and incorporating therein the principles of the present invention. The machine 100 has been illustrated as utilized in the unstacking of bread pans, but it will be seen that the machine 100 is of general utility for unstacking of other forms of pans and like articles having the requisite physical characteristics and shapes to be described more fully hereinafter.

Figure 1:
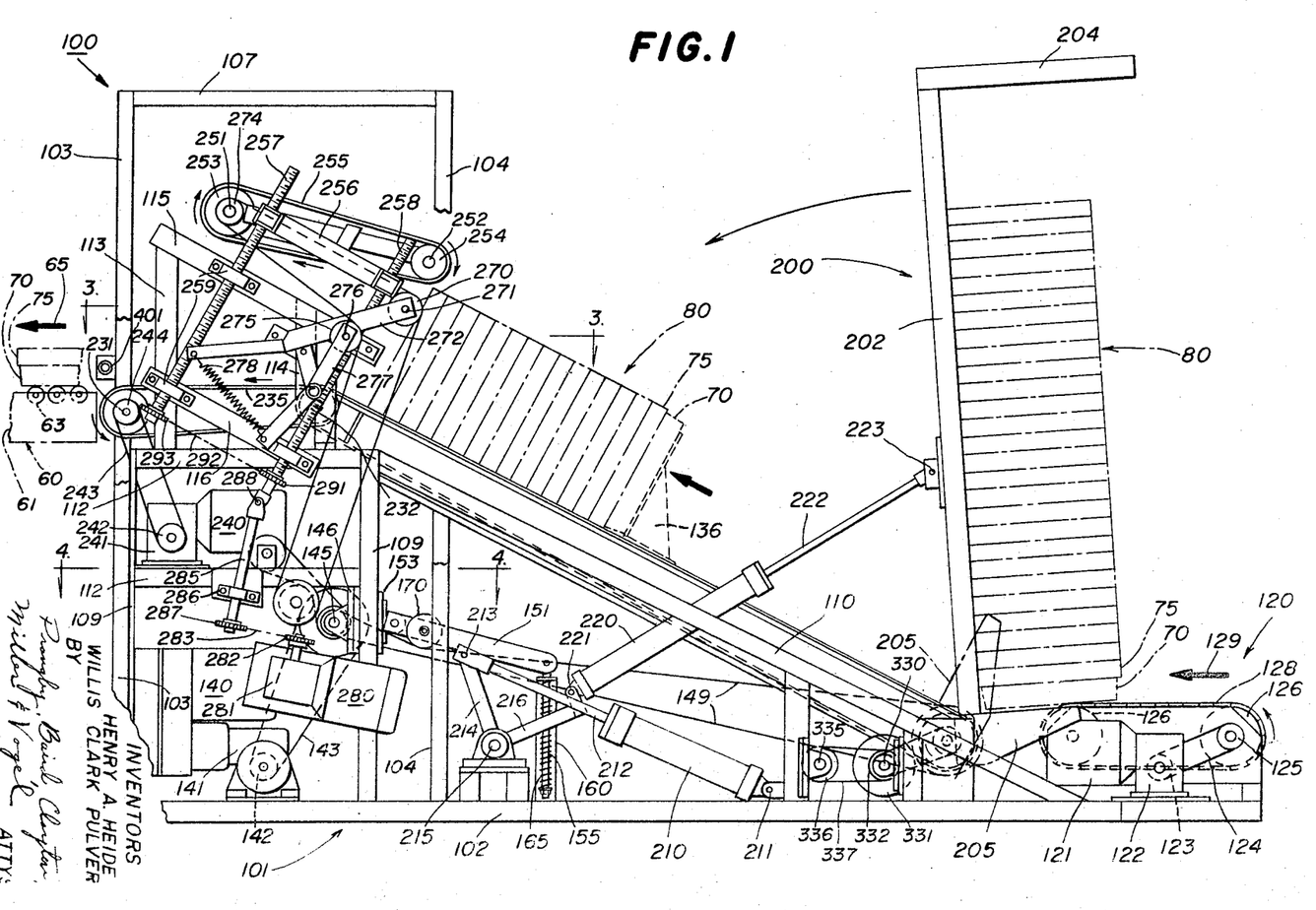
FIG. 1 is a side elevational view, with certain portions broken away, of a machine for unstacking bread pans and the like, which machine is made in accordance with and embodies the principles of the present invention.
Figure 2:
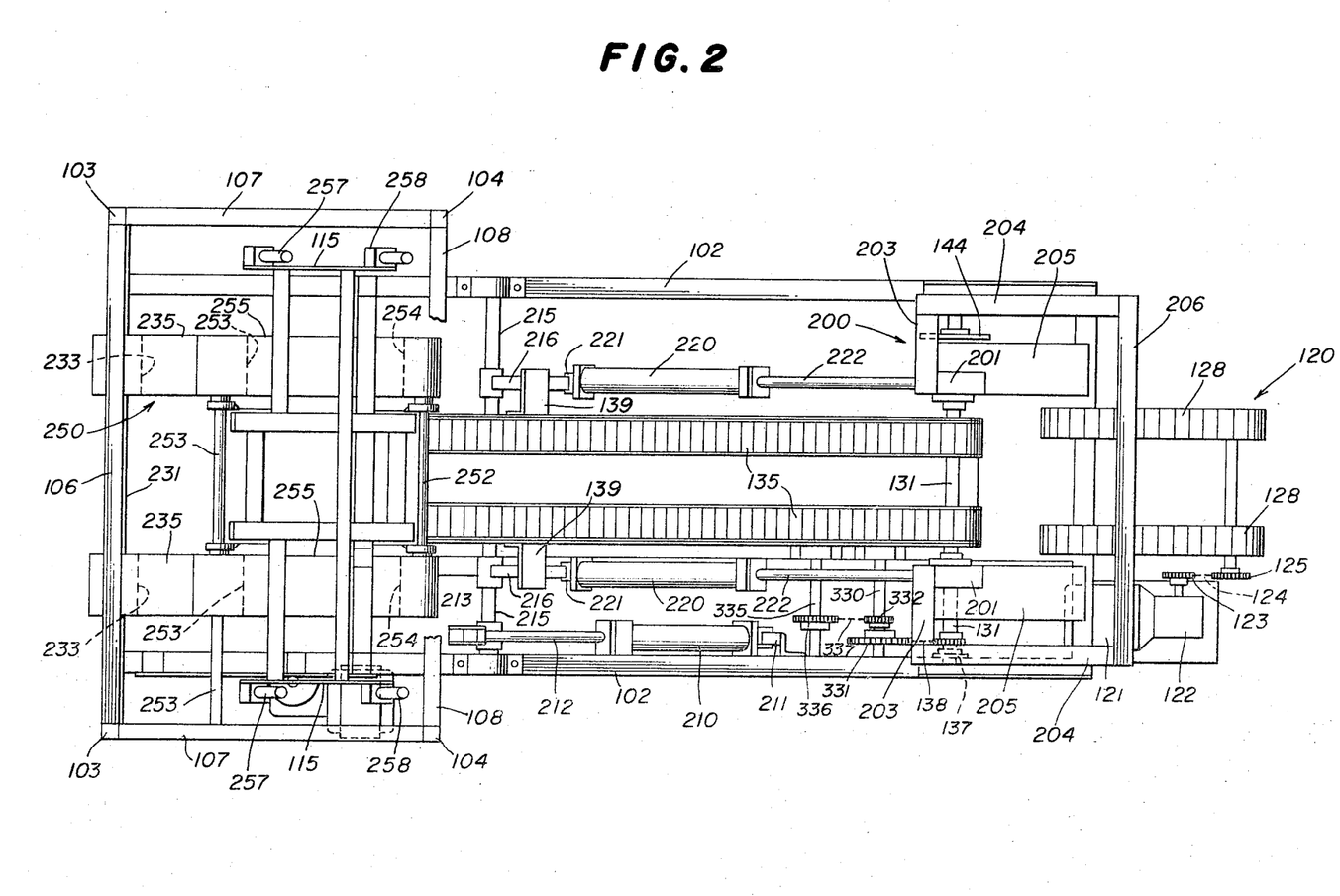
FIG. 2 is a plan view of the machine of FIG. 1.
Figure 3:
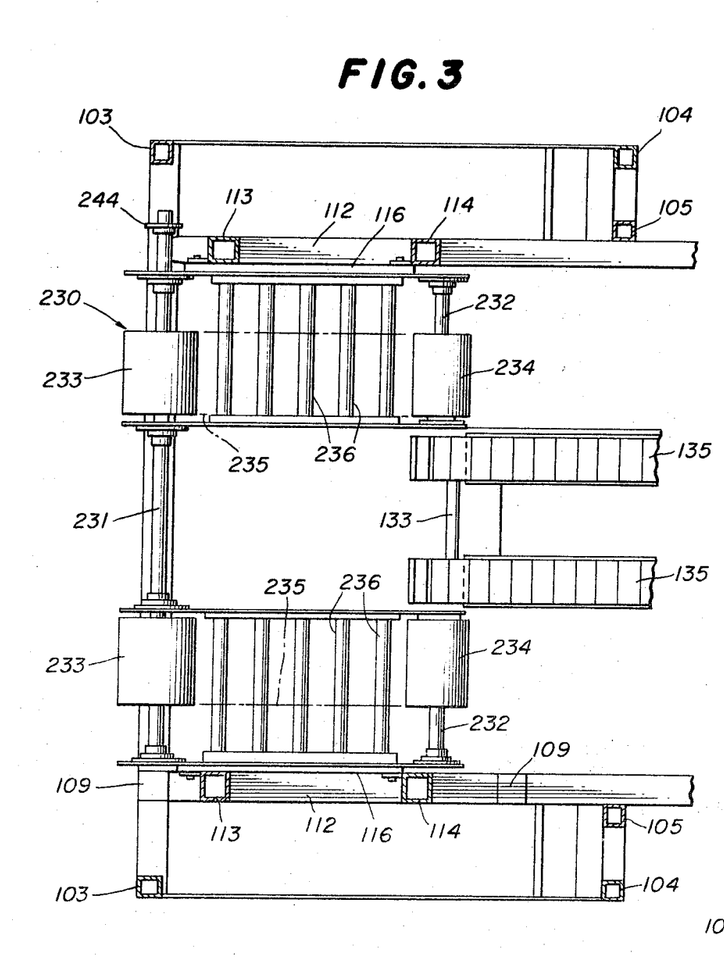
FIG. 3 is a fragmentary horizontal sectional view on an enlarged scale along the line 3—3 of FIG. 1.
Figure 4:
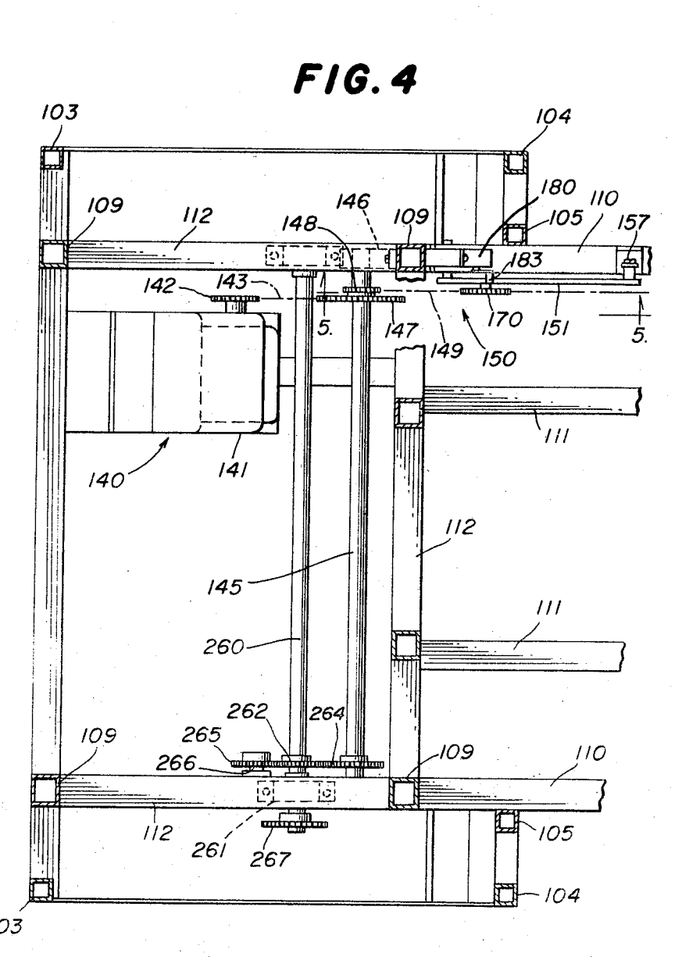
FIG. 4 is a fragmentary horizontal sectional view on an enlarged scale along the lines 4—4 of FIG. 1.

As illustrated, the machine 100 would have associated therewith a supply conveyor, not shown, which would feed stacks 80 of bread pans 70, for example, horizontally and from the right as viewed in FIGS. 1 and 2, the bread pans 70 being arranged in stacks 80 up to heights of 63 inches, for example. The stacks 80 are fed one-by-one onto an infeed conveyor 120 and from the infeed conveyor 120 onto a stack support frame 200, the stack support frame 200 serving to lower the associated stack 80 onto an inclined conveyor 130. The inclined conveyor 130 feeds the stack of pans 80 upwardly until the topmost pan 70 in the stack 80 is engaged by a lower discharge conveyor 230 and thereafter by an upper discharge conveyor 250, the discharge conveyors 230-250 serving to separate the topmost pan 70 from the stack 80 and to deposit the pan 70 on the lower discharge conveyor 230. The discharge conveyor 230 then deposits the pans 70 one-by-one sequentially onto an outfeed conveyor 60, see FIG. 1.

The bread pans 70 are of the usual construction utilized in commercial bakeries, each including a plurality of individual loaf sections (not shown) interconnected by a pan strap 75 into groups of four, for example. The bread pans 70 are free-nesting and self-centering, whereby the bread pans 70 can be formed into the stacks 80 with the pan straps 75 resting one on the other.

The bread pan unstacker 100 includes a main frame 101 having a base 102 formed of hollow square tubing and arranged to rest upon a suitable underlying support surface such as the usual floor found in commercial bakeries. Extending upwardly from the base 102 is a forward pair of vertically extending uprights 103 (disposed to the left in FIGS. 1 and 2) and a second pair of uprights 104 spaced therefrom, the upper ends of the uprights 103 being interconnected by a top frame member 106, adjacent pairs of uprights 103–104 being connected by top frame members 107 and the uprights 104 being connected by a top frame member 108. Disposed inwardly of the uprights 104 are uprights 105 (see FIGS. 2 and 4). A pair of inner uprights 109 is also provided (see also FIGS. 3 and 4). There further are provided an outer set of inclined frame members 110 and an inner set of inclined frame members 111, these inclined frame members being connected by a cross frame member 112, cross frame members 112 also interconnecting the inner uprights 109. In order to mount the upper discharge conveyor 250, there are provided two pairs of uprights 113 and 114, adjacent pairs of uprights 113 and 114 being joined by supports 115 and 116.

Carried by the righthand end of the base 102 as viewed in FIGS. 1 and 2 is the stack infeed conveyor 120, the infeed conveyor 120 being driven by a drive motor 121 driving a gear reducer 122 provided with an output gear or sprocket 123. A drive chain 124 connects the sprocket 123 to a drive sprocket 125 mounted on a shaft that also carries a sprocket 126, four of the sprockets 126 being provided and supporting a pair of belts 128, the belts 128 being driven so that the upper reaches thereof move in the direction of the arrow 129 in FIG. 1. The stack infeed conveyor 120 thereby serves to feed a stack 80 of the bread pans 70 from the right in the direction of the arrow 129 as viewed in FIG. 1, and when the stack support frame 200 is in the receiving position illustrated by solid lines in FIG. 1, the stack infeed conveyor 120 serves to feed the stack 80 thereonto.

The inclined conveyor 130 is also mounted upon the main frame 101 and extends from a point slightly below the upper surface of the stack infeed conveyor 120 upwardly to the upper surface of the lower discharge conveyor 230. More specifically, the inclined conveyor 130 is supported upon a lower shaft 131 disposed adjacent the discharge end of the conveyor 120; the shaft 131 carries a pair of spaced-apart support sprockets 132 and a drive sprocket 144 to be described more fully hereinafter. The upper end of the conveyor 130 is supported by an upper shaft 133 mounted on the main frame 101 carrying a pair of support sprockets 134. Aligned sets of the sprockets 132–134 support thereon a belt 135, two of the belts 135 being provided and spaced-apart a short distance and forming the support portion of the inclined conveyor 130. The belts 135 carry two arms 136 disposed normal thereto and extending outwardly therefrom, the two arms 136 being positioned at opposed points separated equidistantly from each other.

Figure 9:
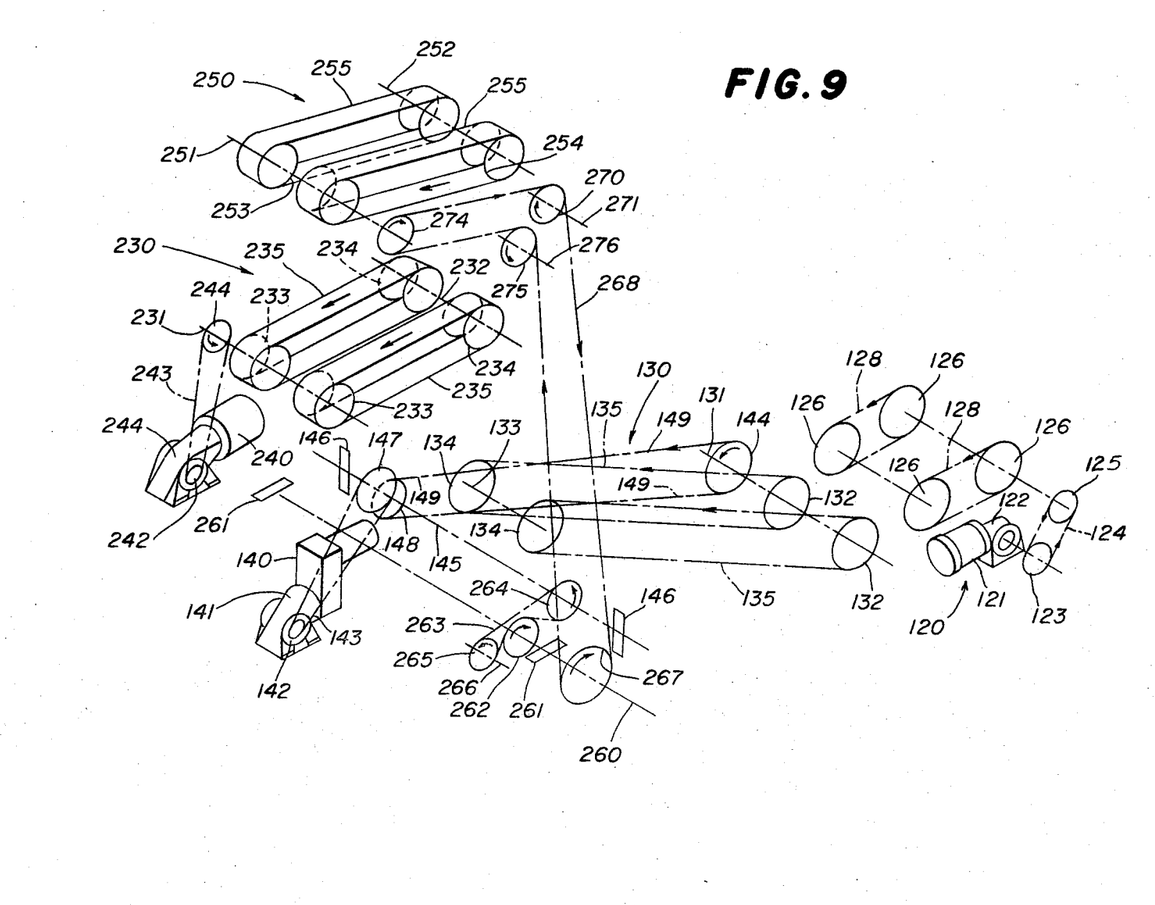
FIG. 9 is a schematic diagrammatic view illustrating the drive for the parts of the machine of FIGS. 1 to 7.

Drive for the inclined conveyor 130 is derived from a drive motor 140 (see FIGS. 1, 4 and 9) mounted on the frame 101 and driving a gear reducer 141 and having an output sprocket 142. A chain 143 interconnects the output sprocket 142 and a sprocket 147 mounted on a shaft 145 suitably mounted for rotation such as by a pair of pillow blocks 146 also mounted on the main frame 101. The shaft 145 carries another sprocket 148 that is connected by a chain 149 to the drive sprocket 144 on the shaft 131. It will be seen therefore that operation of the drive motor 140 serves to drive the inclined conveyor 130 through the drive train described.

Figures 5, 6, 7:
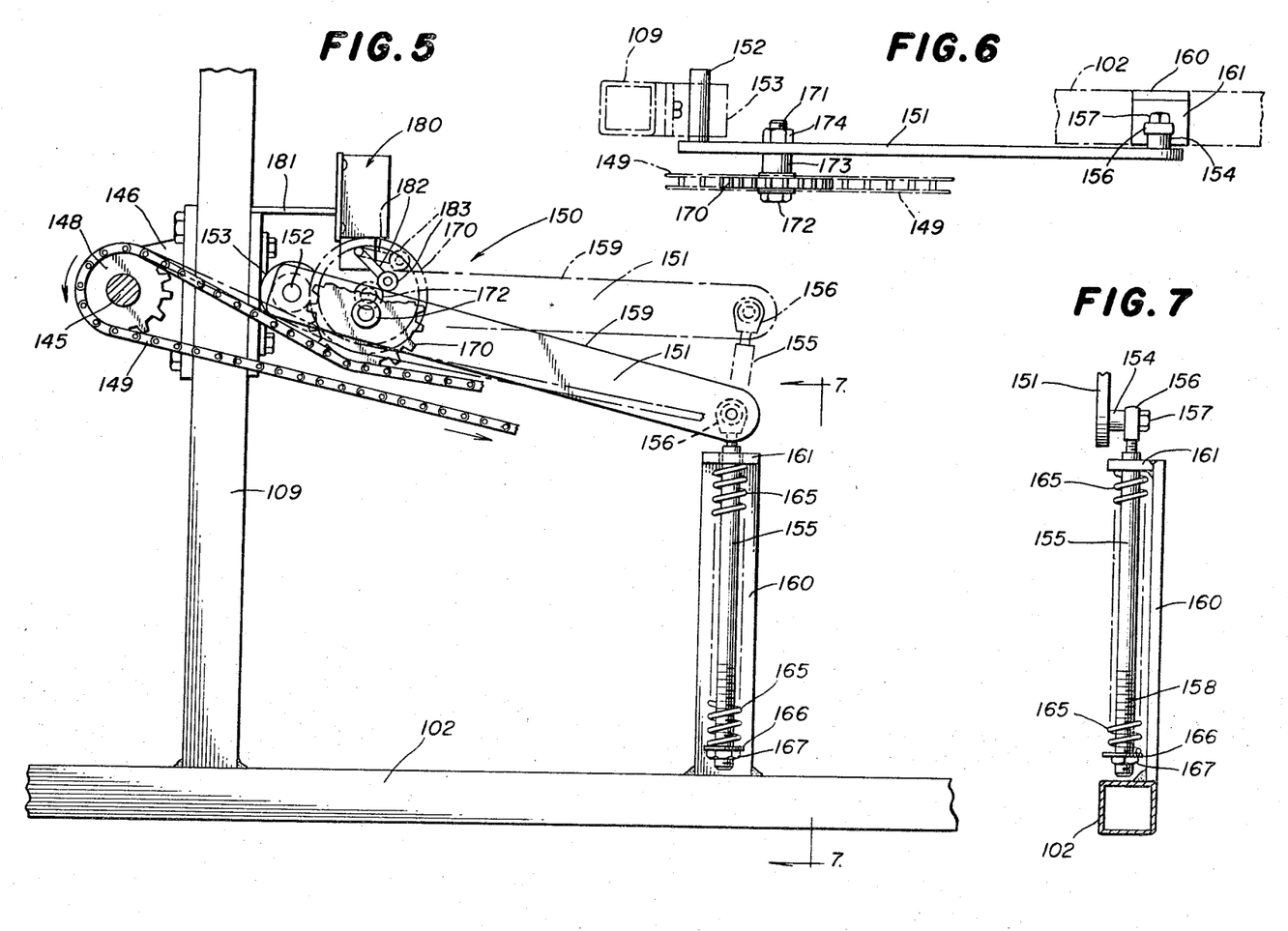
FIG. 5 is an enlarged side elevational view of the control mechanism forming a part of the machine of FIGS. 1 to 4.
FIG. 6 is a plan view of the parts shown in FIG. 5.
FIG. 7 is a view in section along the line 7—7 of FIG. 5.

In accordance with the present invention, an important feature thereof resides in a tension control mechanism 150 controlled by the tension of the chain 149, the details of the mechanism 150 being best illustrated in FIGS. 5 to 7 of the drawings. An arm 151 is pivotally mounted on the adjacent inner upright 109, and more specifically, the arm 151 carries a stub shaft 152 journalled in a pillow block 153 mounted on the inner upright 109. The other end of the arm 151 carries a stub shaft 154 that is connected to a rod 155 through a head 156 held in position on the shaft 154 by a bolt 157. The head 156 is threadedly connected to the upper end of the rod 155, the lower end of the rod 155 being threaded as at 158.

In order to maintain the rod 155 under a predetermined tension, a strut 160 has been mounted on the base 102 and extends upwardly therefrom and carries at the upper end thereof a generally horizontal plate 161 having an opening therein through which extends the upper end of the rod 155. A coil spring 165 surrounds the portion of the rod 155 disposed below the plate 161 and is held in position by the plate 161 and a washer 166 held on the rod 155 by a nut 167. It will be appreciated that by threading the nut 167 and down along the rod 150 the tension produced in the spring 165 can be adjusted.

Intermediate of the ends of the arm 151 there is mounted thereon a sprocket 170, and more specifically there is provided a bolt 171 passing through an opening in the sprocket 170 and an opening in the arm 151, the bolt 171 having a head 172 engaging the sprocket 170, a sleeve 173 being disposed between the sprocket 170 and the arm 151, the parts being held in the assembled position by a nut 175 engaging the threaded shank of the bolt 171. The sprocket 170 engages the chain 149 and is driven thereby and is further moved thereby and is positioned thereby dependent upon the tension in the drive chain 149. More specifically, when there is substantial slack in the drive chain 149, the sprocket 170 is in the lower or solid line position illustrated in FIG. 5, and the arm 151 on which the sprocket 170 is mounted is in the lower position thereof and is held in that position by the tension in the spring 165. When the tension in the chain 149 increases, the sprocket 170 is lifted thereby and in turn lifts the arm 150 about the pivot shaft 152 and against the action of the spring 165, the parts being movable to the dashed line positions illustrated in FIG. 5.

Such movement of the arm 151 is used to control a microswitch 180 which is mounted on the adjacent upright 109 by a bracket 181. The switch 180 is provided with the usual actuator arm 182 carrying at the outer end thereof a roller 183 engaging the arm 151, and particularly a cam surface 159 provided on the top thereof. Accordingly, the condition of the switch 180 is controlled by the position of the arm 151 which in turn is controlled by the tension in the drive chain 149. As will be described more fully hereinafter, the tension in the drive chain 149 can in this manner be used to control and to stop the operation of the machine 100 should the machine become jammed.

The stack support frame 200 is pivotally mounted adjacent to the juncture of the infeed conveyor 120 and the inclined conveyor 130, and more specifically is mounted upon a pair of pivots 201 that in turn are mounted on the frame 101. Secured to the pivots 201 are two longitudinally extending frame members 202 that carry on the outer ends thereof outwardly extending upper frame members 203 disposed in general alignment with each other and extending in opposite directions from the longitudinal frame members 202 (see FIG. 2). Disposed normal to the frame members 203 are longitudinally extending upper frame members 204 joined at the outer ends thereof by a cross frame member 206. Mounted on the lower ends of the frame members 202 are bottom supports 205 extending toward the adjacent infeed conveyor 120 and in the position to receive a stack of pans therefor.

In operation, the stack support frame 200 is pivotal between a first upright position adjacent to the infeed conveyor 120 and a second inclined position adjacent to the inclined conveyor 130. In the first upright position, the stack support frame 200 receives a stack 80 of pans 70 from the infeed conveyor 120, the stack 80 being supported upon the bottom supports 205 and resting against the frame members 202. Through a set of hydraulic motors to be described hereinafter, the stack support frame 200 is then moved to the inclined position wherein the stack 80 of pans 70 thereon is deposited upon the belts 135, the frame members 202 being disposed laterally outwardly with respect to the outer edges of the belt 135.

The hydraulic motors for controlling the position of the stack support frame 200 are best illustrated in FIGS. 1 and 2, wherein it will be seen that there has been provided a first hydraulic motor 210 having one end thereof pivotally mounted as at 211 upon the main frame 101, the usual piston rod 212 extending from the other end thereof. The outer end of the piston rod 212 is pivotally connected as at 213 to the outer end of an arm 214 fixedly secured to a rock shaft 215, the shaft 215 being journalled in the main frame 101. The rock shaft 215 carries a pair of support arms 216 that in turn support hydraulic motors 220. More specifically, each of the arms 216 has pivotally connected thereto one end of an associated hydraulic motor 220 as at 221, the other end of the hydraulic motor 220 having extending therefrom the usual piston rod 222. The outer end of the piston rod 222 is in turn pivotally connected as at 223 to the adjacent longitudinal frame member 202. The motor 210 in cooperation with the motors 220 serves to move the stack support frame 200 between the upright stack receiving position illustrated by solid lines in FIG. 1 and the inclined stack feeding position shown by dashed lines in FIG. 1 wherein the frame members 202 rest upon stop members 139.

The lower discharge conveyor 230 is best illustrated in FIGS. 1, 2, 3, 8 and 9 of the drawings wherein it will be seen that a main drive shaft 231 is provided journalled in the main frame 101 and carrying thereon a pair of longitudinally spaced-apart pulleys 233. Spaced rearwardly with respect to the drive shaft 231 is a pair of longitudinally aligned stub shafts 232 suitably mounted for rotation upon the main frame 101. The stub shafts 232 respectively carry pulleys 234, longitudinally aligned ones of the pulleys 233 and 234 supporting thereon a drive belt 235. Also mounted on the frame 101 are rollers 236 that support the upper reach of the belts 235 to assist in supporting the pans 70 to be carried thereby.

Drive for the lower discharge conveyor 230 is provided by a drive motor 240 (see particularly FIG. 1 in the left-hand portion thereof) driving a gear reducer 241 having an output sprocket 242. Mounted on the shaft 231 is a sprocket 244 that is connected by a chain 243 to the output sprocket 242, whereby to provide a drive train from the motor 240 to the main drive shaft 231 for driving the lower discharge conveyor 230.

Disposed above the lower discharge conveyor 230 is an upper discharge conveyor 250 which is adjustably positioned upon the frame formed by the uprights 113–114 and the supports 115–116. The conveyor 250 is more specifically mounted upon a sub-frame 256 suitably mounted by two pairs of threaded shafts 257 and 258 suitably mounted by bearings 259 on the supports 115–116. The sub-frame 256 carries a drive shaft 251 that supports a pair of spaced-apart pulleys 253 (see FIG. 2), and also carries a shaft 252 that supports a pair of spaced-apart pulleys 254, aligned pairs of the pulleys 253–254 supporting conveyor belts 255.

Drive for the upper discharge conveyor 250 is derived from the drive motor 140, and more specifically from a shaft 260 driven thereby and mounted by means of pillow blocks 261 upon the main frame 101. Drive for the shaft 260 is achieved by means of a sprocket 262 mounted thereon and driven by a chain 263 which is in turn driven by a sprocket 264 mounted on the shaft 145. In order to achieve the proper direction of rotation of the shaft 260, i.e., in the direction opposite to the rotation of the shaft 145, an idler sprocket 265 is provided on a stub shaft 266 mounted in the main frame 101. The drive from the shaft 260 for the upper discharge conveyor 250 is derived from a sprocket 267 mounted on the shaft 260 and engaging a drive chain 268. The drive chain 268 engages a movable sprocket 270 journalled on a shaft 271 mounted on a pivot arm 272. The chain 268 also engages a sprocket 274 on the drive shaft 251 for the upper discharge conveyor 250. A second movable sprocket 275 is also provided and is mounted on a shaft 276 supported by an arm 277, the arm 277 being pivoted on the sub-frame 256. Referring to FIG. 1, it will be seen that the movable sprockets 270 and 275 are movable in that the supporting arms 272 and 277, respectively therefore, are pivoted on the sub-frame 256, the arms 272 and 277 being joined by a spring 278 under tension which urges the arms 272 and 277 and the movable sprockets 270 and 275 respectively carried thereby in directions in keeping the drive chain 268 under tension in all adjusted positions of the upper discharge conveyor 250.

In order to adjust the machine 100 to accommodate different sizes of bread pans 70 in the stack 80, and specifically to accommodate different heights of the bread pan 70 with respect to the inclined conveyor 130, the upper discharge conveyor 250 is adjustable toward and away from the lower discharge conveyor 230 to accommodate different sizes of pans therebetween. The adjustment of the position of the upper discharge conveyor 250 is motor-driven, and specifically, the power therefor is derived from a pan size adjusting motor 280 (see FIG. 1, particularly). The motor 280 drives a gear reducer 281 having an output sprocket 282 engaging a drive chain 283. Journalled on the main frame 101 is an adjusting shaft 285 secured in place by a bearing 286 and carrying on the lower end thereof a sprocket 287 engaged by the drive chain 283. The upper end of the adjusting shaft 285 is connected by means of a universal joint 288 to the lower end of one of the threaded shafts 258. The threaded shaft 258 connected to the universal joint 288 also carries a sprocket 291 driving a chain 292 that engages a sprocket 293 mounted on the threaded shaft 257 associated with the threaded shaft 258. By operating the motor 280 through the drive train described above, the sub-frame 256 that is threadedly mounted on the shafts 257–258 can be moved upwardly and downwardly and toward and away from the lower discharge conveyor 230, whereby to accommodate different sizes of pans 70 between the discharge conveyors 230 and 250.

Figure 10:
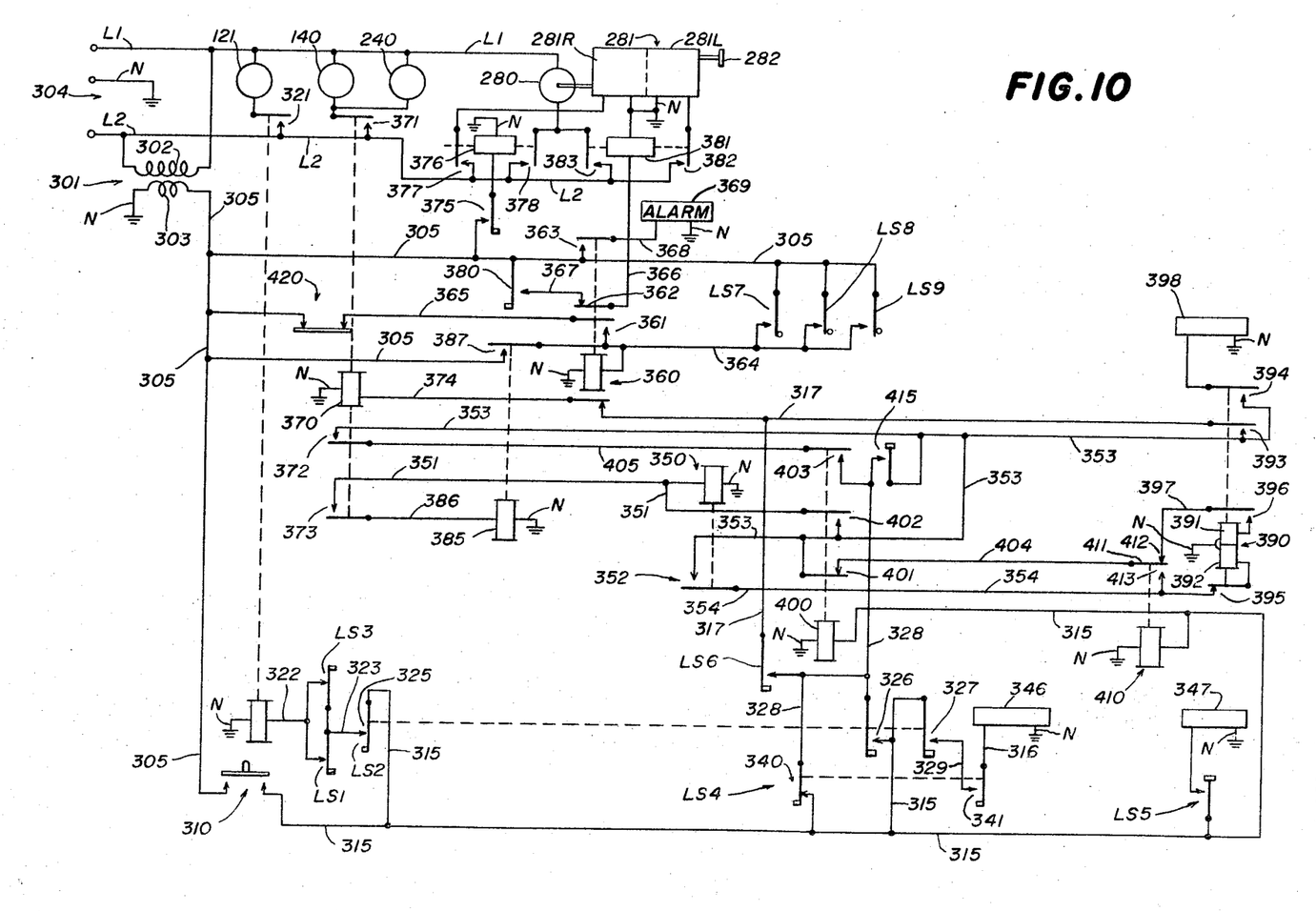
FIG. 10 is a schematic electrical view of the control circuits of the machine of FIGS. 1 to 7.

The control mechanism for the bread pan unstacker 100 and the circuitry therefor is best illustrated in FIG. 10 of the drawings, the control mechanism being essentially designated by the numeral 300. The circuitry illustrated in FIG. 10 causes essentially automatic operation of the bread pan unstacker 100, the several manual controls included in the control mechanism 300 being positioned at any suitable location upon the frame 101 and the major portion of the circuit elements being disposed within a control panel. The control mechanism 300 is operated from a typical commercial electrical source 304 which comprises a 3-wire Edison system including main conductors L1 and L2 and a grounded neutral conductor N. Certain of the components of the control mechanism 300 require a lower potential than that appearing on the conductors L1 and L2, and accordingly there has been provided a step-down transformer 301 including a primary winding 302 connected between the main line conductors L1 and L2 and a secondary winding 303 having one terminal thereof grounded and having the other terminal thereof connected to a conductor 305. One terminal of each of the motors 121, 140, 240 and 280 is connected to the line conductor L1 and the other terminals thereof are suitably connected to the line conductor L2 upon operation of the control mechanism 300.

There is provided a main control switch 310 which when closed connects the conductor 305 to a conductor 315. Control of the motor 121 is provided by a motor relay 320 controlling a pair of switch contacts 321, one of which is connected to the other terminal of the motor 121 and the other of which is connected to the conductor L2. One terminal of the relay 320 is grounded and the other terminal is connected by a conductor 322 to switch contacts for each of a pair of limit switches LS1 and LS3, the other contacts thereof being connected by a conductor 323 to one of the contacts of a pair of contacts 325 forming part of a limit switch LS2 the other contact of the switch pair 325 of LS2 being connected to the conductor 315.

Figure 8:
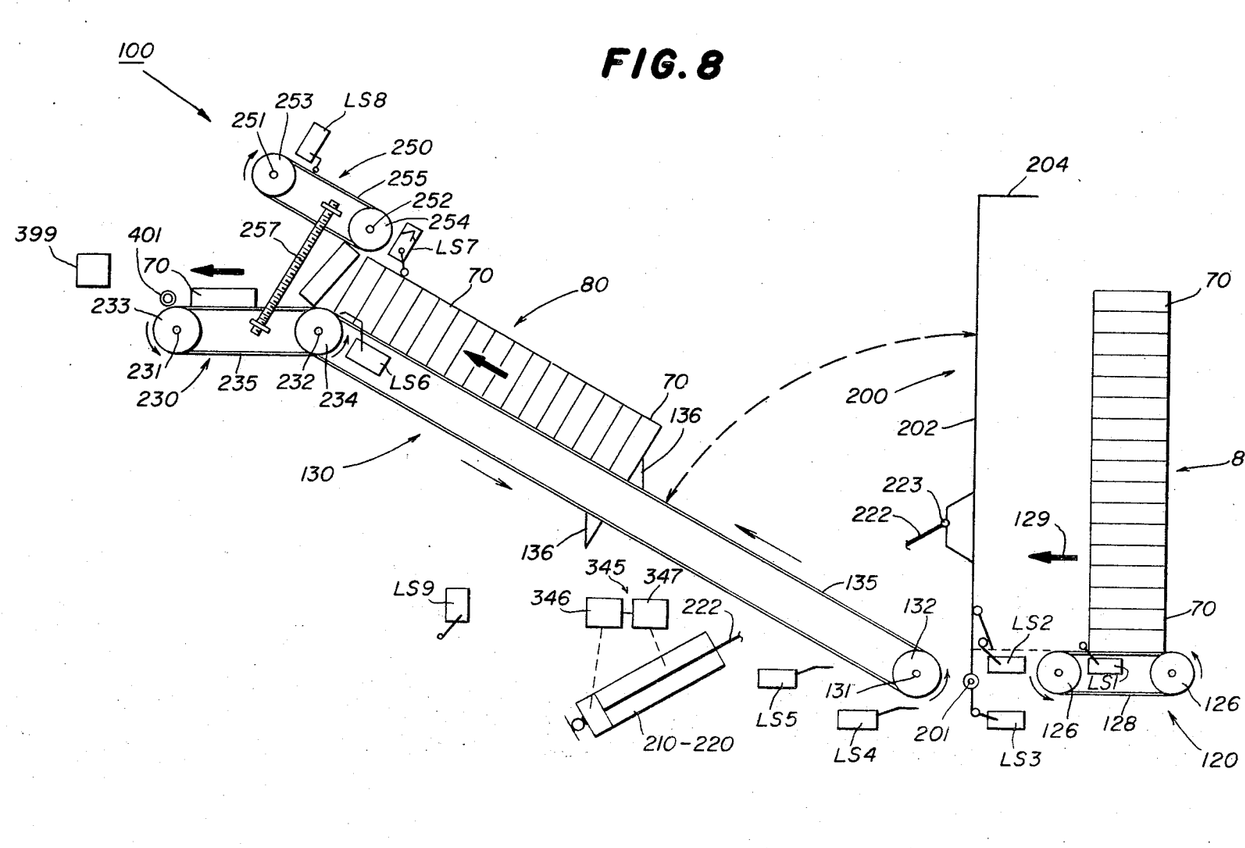
FIG. 8 is a schematic representation of the operating components of the machine of FIGS. 1 to 7 and illustrating the method of operation thereof.

The limit switch LS2 further has switch contacts 326 and 327; one of the contacts of the switch contacts 326 being connected to the conductor 315 and the other being connected to a conductor 328; one of the contacts of the switch contacts 327 is connected to the conductor 315 and the other to a conductor 329. Referring to FIG. 8, it will be seen that the limit switch LS1 is positioned adjacent to the infeed conveyor 120 to be contacted by a pan stack 80 thereon, while the limit switches LS2 and LS3 are positioned adjacent to the stack support frame 200 and are fundamentally actuated by the placement thereof in the stack receiving position illustrated in FIG. 8.

There also are provided two limit switches LS4 and LS5 that are cam driven, the drive therefor being best illustrated in FIG. 2 of the drawings. More specifically, the cams for the limit switches LS4 and LS5 are driven from the lower shaft 131 of the inclined conveyor 130, the shaft 131 being provided with a sprocket 137 driving a chain 138. Mounted on the frame 101 and suitably journalled for rotation therein is a shaft 330 carrying a large sprocket 331 that engages the chain 138. Also journalled in the main frame 101 is a second shaft 335 disposed adjacent to and extending substantially parallel to the shaft 330 and carrying thereon a sprocket 336 engaging a chain 337 driven from a sprocket 332 on the shaft 330. The shafts 330 and 335 carry the cam switches which actuate the limit switches LS4 and LS5. Referring again to FIG. 10, it will be seen that the limit switch LS4 includes two sets of switch contacts 340 and 341, one of the switch contacts 340 being connected to the conductor 315 and the other to the conductor 328. One of the switch contacts 341 is connected to the conductor 329 and the other is connected by a conductor 316 to one terminal of a solenoid control valve 345 (see FIG. 8 also), and more specifically to the "down" coil 346 thereof, the other terminal of the coil 346 being grounded as at N. The valve 345 also includes an "up" coil 347 that is under the control of the limit switch LS5, one contact of the limit switch LS5 being connected to the conductor 315 and the other contact thereof being connected to one terminal of the coil 347, the other terminal of the coil 347 being grounded as at N.

A further limit switch LS6 is provided on the inclined conveyor 130 adjacent to the upper end thereof (see FIG. 8), the circuit connection for the limit switch LS6 as illustrated in FIG. 10 being between the conductor 328 and the conductor 317.

A first control relay 350 is provided having one of the terminals thereof grounded as at N and having the other terminal connected to a conductor 351. The relay 350 controls a single pair of switch contacts 352 that are respectively connected to conductors 353 and 354.

A second control relay 360 has been provided controlling switch contacts 361, 362 and 363. One terminal of the relay 360 is grounded as at N and the other is connected to a conductor 364. One of the switch contacts 361 is also connected to the conductor 364 and the other contact is connected to a conductor 365. One of the contacts 362 is connected to a conductor 366 and the other to a conductor 367. One of the contacts 363 is connected to the conductor 305 and the other via a conductor 368 to one terminal of a suitable alarm mechanism 369 and the other terminal of the alarm mechanism being grounded as at N.

Control for the motor 140 is provided by a relay 370 having three pairs of switch contacts 371, 372 and 373. One terminal of the relay 370 is grounded as at N and the other is connected to a conductor 374. One of the switch contacts 371 is connected to the line conductor L2 while the other is connected to the other terminal of the motor 140, whereby upon closure of the switch contacts 371, the motor 140 driving the inclined conveyor 130 will be energized. The other one of the switch contacts 371 is also connected to the other terminal of the motor 340 whereby upon closure of the switch contacts 371, the lower discharge conveyor motor 240 is energized.

Control for the motor 280 is also illustrated in FIG. 10, the motor 280 driving the mechanism 281 which is a reversible clutch and gear reducing mechanism, whereby the output sprocket 282 may be driven in either direction so as either to lower or to raise the upper discharge conveyor 250 with respect to the lower discharge conveyor 230. In order to provide for raising of the conveyor 250, a "raise" pushbutton switch 275 has been provided having one contact connected to the conductor 305 and the other contact connected to one terminal of a "raise" relay 376, the other terminal of the relay 376 being grounded as at N. The relay 376 controls two pairs of switch contacts 377 and 378, the switch contacts 377 providing a connection from the conductor L2 to one of the terminals of a "raise" coil 281R for the mechanism 281, the other terminal thereof being grounded as at N, closure of the switch contacts 377 causing the output 282 to be rotated in a direction to raise the conveyor 250. The switch contacts 378 provide a connection between the line conductor L2 and the other terminal of the motor 280 to accomplish the raising of the conveyor 250.

A like structure has been provided to lower the conveyor 250 and to this end a "lower" pushbutton switch 380 has been provided having one terminal connected to the conductor 305 and the other connected to the conductor 367. The conductor 367 is connected via the switch contacts 362 and the conductor 366 to one terminal of a "lower" relay 381, the other terminal of the relay 381 being grounded as at N. The relay 381 controls two pairs of switch contacts 382 and 383, the switch contact 382 connects the conductor L2 and one terminal of a "lower" coil 281L on the mechanism 281, the other terminal of the coil 281L being grounded as at N. The switch contacts 383 when closed connect the conductor L2 to the other terminal of the motor 280. Accordingly, when the relay 381 is energized, the motor 280 operates to drive the mechanism 281, and due to the energization of the coil 281L, the output sprocket 281 operates in a direction to lower the discharge conveyor 250 with respect to the discharge conveyor 230.

Connected between the conductors 305 and 364 are three limit switches LS7, LS8 and LS9, the physical location of these limit switches being illustrated in FIG. 8. The limit switch LS7 is used to detect whether the sizes of the pan 70 in the stack 80 are proper and of a size such that the discharge conveyors 230 and 250 can feed the same. The limit switch LS8 detects the presence of pans being fed by the discharge conveyor 250 and the limit switch LS9 is a part of the switch 180 referred to above and the actuation of which was described in detail in FIG. 5 of the drawings.

A time delay relay 385 has been provided having one terminal thereof grounded as at N and having the other terminal connected by a conductor 386 to one of the switch contacts 373. The time delay relay 385 controls a pair of switch contacts 387, one of the contacts thereof being connected to the conductor 305 and the other contact thereof being connected to the conductor 364. Preferably the time delay relay 385 is adjusted to provide a time delay of about two seconds.

Another control relay 390 is provided and includes an upper winding 391 and a lower winding 392, the upper winding 391 controlling two sets of switch contacts 393 and 394 while the lower winding 392 controls a single pair of switch contacts 395. One terminal of the upper winding 391 is grounded as at N while the other terminal is connected to a pair of switch contacts 396 also controlled by the upper coil 391, the other of the switch contacts 396 being connected to a conductor 397. One of the switch contacts 393 is connected to the conductor 353 and the other is connected to the conductor 317, while one of the switch contacts 394 is also connected to the conductor 353 and the other is connected to one terminal of a solenoid valve 398 controlling a gate 399 (see FIG. 8) associated with the outfeed conveyor that receives pans from the discharge conveyors 230–250. The other terminal of the solenoid 398 is grounded as at N. One terminal of the lower coil 392 is grounded as at N and the other terminal is connected through the normally closed switch contacts 395 to the conductor 354.

A first photoelectric control relay 400 is provided that is controlled by the electric eye 401 (see FIG. 8) adjacent to the discharge end of the lower discharge conveyor 230. One terminal of the relay 400 is grounded as at N and the other terminal is connected to the conductor 315. The relay 400 controls three pairs of switch contacts 401, 402 and 403. One of the switch contacts 401 is connected to the conductor 353, while the other is connected to a conductor 404. One of the switch contacts 402 is connected to the conductor 351 while the other is connected to the conductor 353. One of the switch contacts 403 is connected to the conductor 328 while the other is connected to a conductor 405.

A second photoelectric control relay 410 is provided, the photoelectric eye for controlling the relay 410 being associated with the outfeed conveyor receiving pans from the discharge conveyors 230 and 250 and positioned to detect whether additional pans are needed from the bread pan unstacker 100. One terminal of the relay 410 is grounded as at N and the other is connected to the conductor 315. The relay 410 controls a movable switch contact 411 engaging alternately switch contacts 412 and 413. Normally the switch contacts 411–412 are in engagement providing a connection between the conductors 397 and 404. When the relay 410 is energized, connection is made between the switch contacts 411–413 to interconnect the conductors 353 and 404. Finally, there is provided a switch 415 that is normally open and which when closed connects the conductors 328 and 353.

In the operation of the bread pan unstacker 100, the main switch 310 is first closed, the closure of the switch 310 energizing the motor relays 320 and 370 to cause operation of the motors 121, 140 and 240, whereby the four conveyors 120, 130, 230 and 250 are placed in operation. After a short period of operation, the cam associated with the limit switch LS4 will operate to open the heretofore closed contacts 340 and thus to de-energize the motor relay 370 to stop operation of the inclined conveyor 130 and the discharge conveyors 230 and 250. Opening of the switch contacts 340 will also close the contacts 341 on the limit switch LS4.

The stack 80 fed by the conveyor 120 will trip the limit switch LS2 closing both of the contacts thereof. The contacts 327 in series with the now closed contacts 341 of the limit switch LS4 will complete a circuit for the down solenoid 346, which will cause operation of the air motors 210 and 220 to move the stack support frame 200 from the upright position illustrated by solid lines in FIG. 1 to the inclined position adjacent to the inclined conveyor 130, thereby to move the associated stack 80 from the infeed conveyor 120 to position it upon the inclined conveyor 130. The contacts 320 of the limit switch LS2 will also be closed to complete a circuit starting operation of the inclined conveyor 130. Operation of the inclined conveyor 130 will release the limit switch LS3 and the contact thereof opens to lock-out the contacts of the limit switch LS2 to prevent operation of the infeed conveyor 120 when the stack 80 moves up the inclined conveyor 130 and releases the limit switch LS2. The next stack 80 to enter onto the infeed conveyor 120 trips the limit switch LS1 and stops the infeed conveyor 120 thus holding the stack 80 in a "ready" position.

The inclined conveyor 130 also releases the limit switch LS4 when the stack 80 moves away from the limit switch LS2 as described above. Although the normally open contacts of the limit switch LS2 are now open, the inclined conveyor 130 continues its operation through the normally closed contact of the limit switch LS4.

When the top of the stack 80 operates the limit switch LS8, it operates to stop the inclined conveyor motor 140 until the interlock contact on the outfeed conveyor associated with the gate 399 closes indicating a need for additional pans. The inclined conveyor 130 will then operate and pause alternately in response to this interlocking arrangement. Each time the interlock contact opens indicating the unstacker 100 should pause, the inclined conveyor 130 will continue to operate until the photoelectric eye 401 controlling the relay 400 shows that the last pan 70 unstacked has been discharged from the lower discharge conveyor 230.

During the unstacking of the pans 70, if the pans 70 from the machine 100 obstruct the photoelectric eye associated with the relay 410, the relay 390 will be unlatched, provided that the photoelectric beam is made controlling the relay 400. This will open the gate 399 and the inclined conveyor 130 will stop.

When light is received continuously by the photoelectric eye associated with the relay 410 for a period greater than a time delay setting therefor (a time period of about 3 seconds), the relay 410 will cause the relay 390 to latch, the pan gate 399 will close and the inclined conveyor 130 will operate again.

When the inclined conveyor 130 is operating, if the light beam of the photoelectric eye associated with the relay 400 is obstructed continuously for a period greater than the time delay setting of the time relay 385 (i.e. about 2 seconds), this indicates that pans 70 are accumulating at the discharge from the machine 100. Should this occur, or if any of the safety limit switches LS6, LS7 and LS9 are operated, the relay 360 will energize to stop the inclined conveyor 130. When this occurs, the cause of the safety shut-down must be removed, after which the unstacker 100 can be again started by operating a reset pushbutton 420 (see FIG. 10).

Whenever the stack 80 disposed upon the inclined conveyor 130 has been reduced to a size that clears the stack support frame 200, a cam actuates the limit switch LS5 that serves to energize the solenoid valve 347. This causes the air motors 210–220 to be extended to raise the stack support frame 200 from the inclined position adjacent to the inclined conveyor 130 to the upright position illustrated by solid lines in FIG. 8. The unstacker 100 is now in a position to receive the next stack 80 from the infeed conveyor 120, after which the sequence of operations outlined above will be repeated.

In an illustrative example of the bread pan unstacker 100, the overall length thereof is about 10 feet, the overall width thereof is about 4½ feet and the overall height thereof is about 6½ feet. The upper surface of the infeed conveyor 120 is disposed about 15 inches above the support surface and the overall length of the infeed conveyor 120 is about 18 inches. The overall length of the inclined conveyor 130 is about 6 feet and the overall length of the lower discharge conveyor 230 is about 20 inches. The upper reach of the lower discharge conveyor 230 is disposed about 4 feet above the supporting surface. The maximum adjustable distance between the discharge conveyors 230–250 at the closest approach to each other is about 18 inches, whereby this is a maximum width of the bread pan 70 that can be fed thereby, while the minimum distance therebetween is about 7½ inches, and accordingly this is the minimum width of the bread pan 70 that can be fed thereby. The maximum height of the stack 80 that can be handled in the unstacker 100 is 63 inches; such a stack contains from 30 to 34 bread pans of the usual full-nesting type. The unstacker 100 can feed at a rate in excess of 40 pans per minute with approximately 8 seconds required to cycle the machine between stacks 80.

Figure 11:
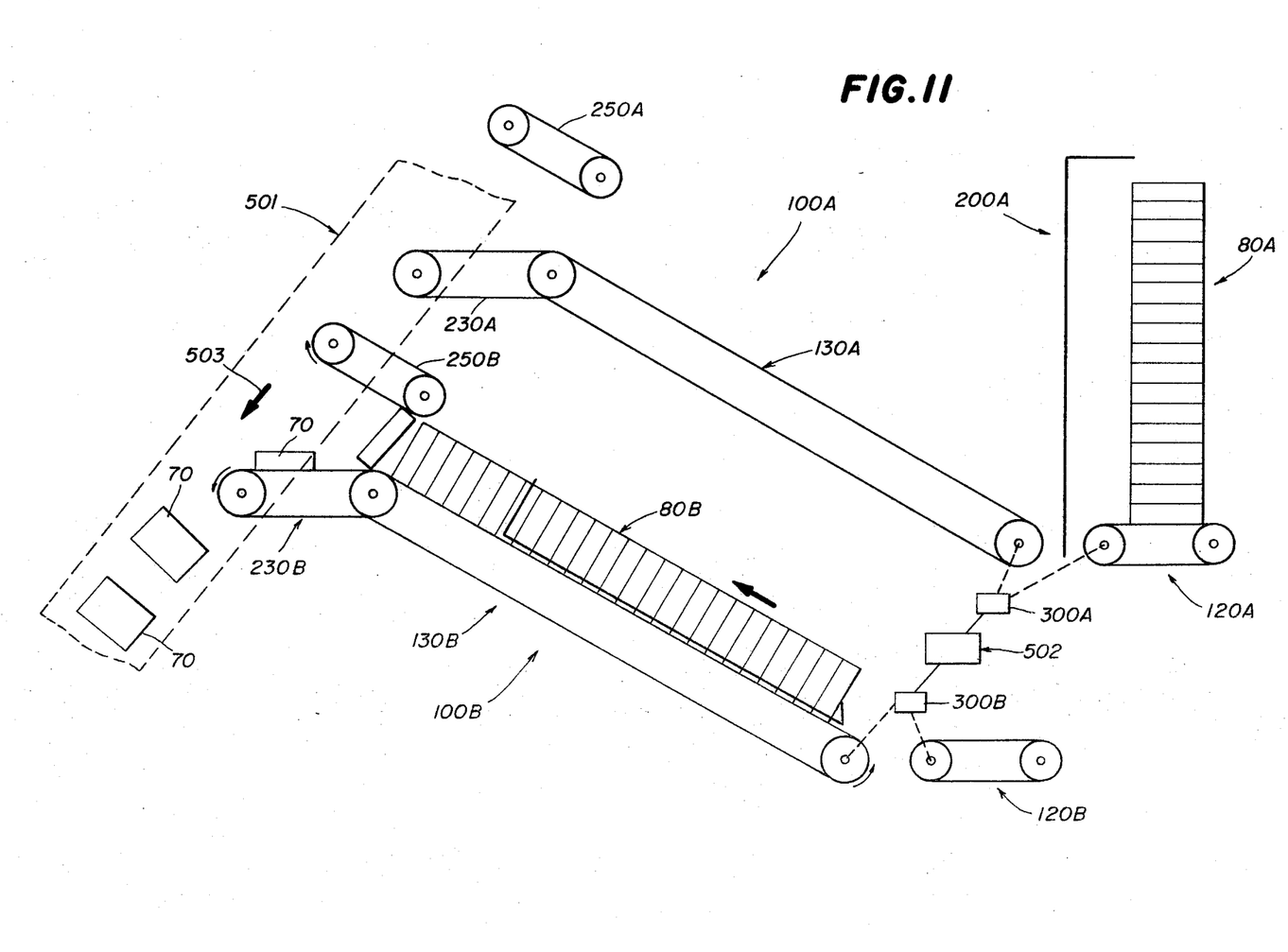
FIG. 11 is a schematic view of a pan unstacking system utilizing two of the machines of the present invention feeding a common outfeed conveyor.

There is illustrated in FIG. 11 of the drawings, a modified bread pan unstacker system 500 which is particularly adapted to handle stacks of "Pullman" pans or other pans which have essentially parallel sides, whereby there is little nesting of one pan within the other. Typically only seventeen such pans can be placed in a stack that will not exceed 63 inches in height, whereby an entire stack of pans can be fed by the pan unstacker 100 described above in only a few seconds. Accordingly, if it is desired to have a continuous feed of such pans, one bread pan unstacker 100 will not be sufficient for the purpose.

In the system 500 illustrated in FIG. 11, two of the unstackers 100 have been shown feeding a single outfeed conveyor 501 so that continuous and uninterrupted feeding of pans, such as "Pullman" pans, can be readily achieved. Since the two bread pan unstackers in the system 500 are essentially identical to each other and to the unstacker 100 described above, one of the machines has had applied thereto the same reference numerals as the bread pan unstacker 100 with the addition of the suffix "A," while the other bread pan unstacker in the system 500 has had applied thereto the same reference numerals as the bread pan unstacker 100 with the addition of the suffix "B."

An interconnecting control system 502 is also provided in the system 500 which in turn control the control mechanisms 300A and 300B of the two bread pan unstackers 100A and 100B. As illustrated, a stack 80A is in position upon the infeed conveyor 120A and the stack support frame 200A is in the position to receive the same; while a stack 80B is in position to receive the same; while a stack 80B is in position upon the inclined conveyor 130B and is being fed thereby to the discharge conveyor 230B and 250B for discharge of the individual pans 70 one-by-one upon the outfeed conveyor 501.

While there is still a substantial number of pans in the stack 80B, the unstacker 100A will be actuated by the control system 502 to move the stack 80A by means of the stack support frame 250A from the infeed conveyor 120A onto the inclined conveyor 100A and then upwardly on the inclined conveyor 150A in position for readiness to feed the discharge conveyors 230A and 250A. As illustrated, the outfeed conveyor 501 is moving in the direction of the arrow 503, whereby the unstacker 100A is disposed upstream with respect thereto while the unstacker 100B is disposed downstream, the general direction of the travel of the outfeed conveyor 501 being normal to the direction of travel of the discharge conveyors 230A and 230B. Since the last pan 70 fed from the unstacker 100B will be deposited downstream with respect to the outlet of the discharge conveyor 230A for the unstacker 100A, it is desirable to begin operation of the unstacker 100A a short time before the completion of the unstacking operation by the machine 100B, thereby to maintain a continuous and uninterrupted flow of unstacked pans on the outfeed conveyor 501.

On the other hand, when the unstacker 100A is supplying the unstacked pans to the outfeed conveyor 501, it is necessary to delay the beginning of the unstacking operation by the unstacker 100B until a short time after the completion of feeding of pans 70 from the unstacker 100A so as to permit the last pan 70 fed by the unstacker 100A to clear the discharge end of the discharge conveyor 230B before the first bread pan 70 is discharged thereby. This necessary control of the time of feed of the pans 70 from the unstackers 100A and 100B is accomplished by the control system 502. By the above described system, a continuous flow of bread pans 70 can be achieved from the system 500 on the outfeed conveyor 501, even when the recycling for the individual unstackers 100A and 100B is a substantial fraction of the time required for unstacking a stack of pans thereby.

While there has been described what is at present considered to be certain preferred embodiments of the invention, it will be understood that various modifications may be made therein, and it is intended to cover in the appended claims all such modifications as fall within the true spirit and scope of the invention.

What is claimed is:

1. A machine for removing bread pans and the like one-by-one from a stack thereof comprising an infeed conveyor for conveying a stack of pans, an inclined conveyor disposed adjacent to the discharge end of said infeed conveyor, a stack support frame positioned adjacent to the discharge end of said infeed conveyor, said stack support frame having a first position for receiving and arresting the movement of a stack of pans from said infeed conveyor and a second position for placing the stack of pans upon said inclined conveyor, support drive mechanism for moving said stack support frame between the first and second positions thereof to receive and to arrest a stack of pans and to place the arrested stack of pans upon said inclined conveyor, a discharge conveyor for engaging the top pan on the stack of pans disposed on said inclined conveyor for sequentially removing the pans from the upper end of the stack of pans on said inclined conveyor and for delivering the pans one-by-one therefrom, drive mechanisms for said conveyors, and control mechanism responsive to the drive mechanism for said inclined conveyor to halt operation of said drive mechanisms when a stack of pans on said inclined conveyor is not being readily conveyed thereby.

2. The machine set forth in claim 1, wherein said control mechanism includes means responsive to the placement of said support frame out of the first position thereof for stopping operation of said infeed conveyor until said stack support frame is returned to the first position thereof.

3. The machine set forth in claim 1, wherein said support drive mechanism is an air motor.

4. The machine set forth in claim 1, wherein said control mechanism includes means for causing movement of said stack support frame from the second position thereof to the first position thereof when the size of the stack of pans on said inclined conveyor reaches a predetermined value.

5. A machine for removing bread pans and the like one-by-one from a stack thereof comprising an infeed conveyor for conveying a stack of pans, an inclined conveyor disposed adjacent to the discharge end of said infeed conveyor, a stack support frame positioned adjacent to the discharge end of said infeed conveyor, said stack support frame having a first position for receiving and arresting the movement of a stack of pans from said infeed conveyor and a second position for placing the stack of pans upon said inclined conveyor, support drive mechanism for moving said stack support frame between the first and second positions thereof to receive and to arrest a stack of pans and to place the arrested stack of pans upon said inclined conveyor, a lower discharge conveyor for engaging the adjacent lower end of the top pan on the stack of pans disposed on said inclined conveyor, an upper discharge conveyor for engaging the adjacent upper end of the top pan on the stack of pans disposed on said inclined conveyor, said lower discharge conveyor and said upper discharge conveyor cooperating sequentially to remove the pans from the upper end of the stack of pans on said inclined conveyor and to deposit the pans one-by-one on said lower discharge conveyor, drive mechanisms for said conveyors, and control mechanism responsive to the drive mechanism for said inclined conveyor to halt operation of said drive mechanisms when a stack of pans on said inclined conveyor is not being readily conveyed thereby.

6. The machine set forth in claim 5, wherein the ends of said discharge conveyors disposed toward said inclined conveyor are adjustable toward and away from each other to accommodate different sizes of pans.

7. The machine set forth in claim 6, wherein said control mechanism includes means for detecting the size of pans disposed on said inclined conveyor and interrupting operation of said machine if the adjacent ends on said discharge conveyors are adjusted to a size other than that detected.

8. The machine set forth in claim 5, wherein said control mechanism includes means for stopping operation of said machine if the pan on said lower discharge conveyor is held thereon.

9. A machine for removing bread pans and the like one-by-one from a stack thereof comprising an infeed conveyor for conveying a stack of pans, an inclined conveyor disposed adjacent to the discharge end of said infeed conveyor, a stack support frame positioned adjacent to the discharge end of said infeed conveyor, said stack support frame having a first position for receiving and arresting the movement of a stack of pans from said infeed conveyor and a second position for placing the stack of pans upon said inclined conveyor, support drive mechanism for moving said stack support frame between the first and second positions thereof to receive and arrest a stack of pans and to place the arrested stack of pans upon said inclined conveyor, a discharge conveyor for engaging the top pan of the stack of pans disposed on said inclined conveyor for sequentially removing the pans from the upper end of the stack of pans on said inclined conveyor for delivering the pans one-by-one therefrom, drive mechanism for said inclined conveyor including a drive chain normally having a predetermined tension therein, and control mechanism including a switch responsive to the tension in said drive chain for stopping operation of said inclined conveyor when said drive chain is under a tension greater than said predetermined tension therein.

10. The machine set forth in claim 9, wherein the control mechanism further includes a sprocket engaging said drive chain and mounted on an arm which is pivotally mounted and acts against a predetermined tension for actuating said switch.

11. The machine set forth in claim 9, wherein the tension in said drive chain at which said switch is actuated is adjustable.

12. A machine for removing bread pans and the like one-by-one from stacks thereof comprising two infeed conveyors each for conveying a stack of pans thereon, two inclined conveyors respectively disposed adjacent to the discharge ends of said infeed conveyors, two stack support frames respectively positioned adjacent to the discharge ends of said infeed conveyors, each of said stack support frames having a first position for receiving and arresting the movement of a stack of pans from the associated infeed conveyors and a second position for placing the stack of pans upon the associated inclined conveyor, two support drive mechanisms respectively for moving said stack support frames between the first and second positions thereof to receive and to arrest a stack of pans from the associated infeed conveyor and to place the arrested stack of pans upon the associated inclined conveyor, two discharge conveyors for engaging respectively the top pan on the stack of pans disposed on the associated inclined conveyor for sequentially removing the pans from the upper end of the stack of pans on the associated inclined conveyor, a common outfeed conveyor disposed adjacent to the discharge ends of said discharge conveyors for receiving pans therefrom, drive mechanism for said conveyors, and control mechanism for alternately operating said support drive mechanism and said inclined conveyors for alternately feeding pans to said outfeed conveyor first from one of said inclined conveyors and then from the other of said inclined conveyors.

13. The machine set forth in claim 12, wherein the direction of feed of said outfeed conveyor is disposed essentially normal to the direction of feed of said discharge conveyors.

14. The machine set forth in claim 12, wherein said control mechanism includes time delay means to delay the beginning of operation of the inclined conveyor disposed downstream with respect to said outfeed conveyor until the last pan fed from the inclined conveyor disposed upstream with respect to said outfeed conveyor has cleared the discharge end of the downstream discharge conveyor.

15. A machine for removing bread pans and the like one-by-one from stacks thereof comprising two infeed conveyors each for conveying a stack of pans thereon, two inclined conveyors respectively disposed adjacent to the discharge ends of said infeed conveyors, two stack support frames respectively positioned adjacent to the discharge ends of said infeed conveyors, each of said stack support frames having a first position for receiving and arresting the movement of a stack of pans from the associated infeed conveyors and a second position for placing the stack of pans upon the associated inclined conveyor, two support drive mechanisms respectively for moving said stack support frames between the first and second positions thereof to receive and to arrest a stack of pans from the associated infeed conveyor and to place the arrested stack of pans upon the associated inclined conveyor, two lower discharge conveyors for engaging respectively the adjacent lower end of the top pan on the stack of pans disposed on the associated inclined conveyor, two upper discharge conveyors for engaging respectively the adjacent upper end of the top pan on the stack of pans disposed on the associated inclined conveyor, the associated ones of said lower discharge conveyor and said upper discharge conveyor cooperating sequentially to remove the pans from the upper end of the stack of pans on the associated inclined conveyor and to deposit the pans one-by-one on the associated lower discharge conveyor, a common outfeed conveyor disposed adjacent to the discharge ends of said lower discharge conveyors for receiving pans therefrom, drive mechanisms for said conveyors, and control mechanism for alternately operating said support drive mechanisms and said inclined conveyors for alternately feeding pans to said outfeed conveyor first from one of said inclined conveyors and then from the other of said inclined conveyors.

16. The machine set forth in claim 15, wherein the direction of feed of said outfeed conveyor is disposed essentially normal to the direction of feed of said lower discharge conveyors.

17. The machine set forth in claim 15, wherein said control mechanism includes time delay means to delay the beginning of operation of the inclined conveyor disposed downstream with respect to said outfeed conveyor until the last pan fed from the inclined conveyor disposed upstream with respect to said outfeed conveyor has cleared the discharge end of the downstream lower discharge conveyor.

References Cited

UNITED STATES PATENTS 2,161,836  6/1939  Stevenson.
2,498,740  2/1950  Miller.

ROBERT G. SHERIDAN, Primary Examiner

G. F. ABRAHAM, Assistant Examiner

U.S. Cl. X.R.

198—35